(12) United States Patent
Weisgerber

(10) Patent No.: US 7,664,797 B1
(45) Date of Patent: Feb. 16, 2010

(54) METHOD AND APPARATUS FOR USING STATISTICAL PROCESS CONTROL WITHIN A STORAGE MANAGEMENT SYSTEM

(75) Inventor: William R. Weisgerber, Lake Mary, FL (US)

(73) Assignee: Symantec Operating Corporation, Mountain View, CA (US)

( * ) Notice: Subject to any disclaimer, the term of this patent is extended or adjusted under 35 U.S.C. 154(b) by 701 days.

(21) Appl. No.: 11/045,610

(22) Filed: Jan. 27, 2005

(51) Int. Cl.
*G06F 17/30* (2006.01)

(52) U.S. Cl. .............................. 707/204; 711/113; 714/6
(58) Field of Classification Search ........................ None
See application file for complete search history.

(56) References Cited

U.S. PATENT DOCUMENTS

| | | | |
|---|---|---|---|
| 5,854,754 A * | 12/1998 | Cabrera et al. ................. | 703/2 |
| 6,542,886 B1 * | 4/2003 | Chaudhuri et al. ............. | 707/2 |
| 7,092,920 B2 * | 8/2006 | Heard .......................... | 706/12 |
| 2002/0069186 A1 * | 6/2002 | Moore ......................... | 705/401 |
| 2002/0107877 A1 * | 8/2002 | Whiting et al. ............. | 707/204 |

OTHER PUBLICATIONS

Przemyslaw Pochec, Modelling the performance of computer mirroring with difference queues, University of New Brunswick, Fredericton, Canada E3A 5A3, 4 pages.*
Jack F. Conn, Normal Forms for Analatic Poisson structures, Anna;s of Mathematics, 119 (1984).25 pages.*
Jon Doyle, event recognition beyond signature and anomaly, Massachusetts institute of technology, 7 pages.*
H. Vold et al. Optimal Backup of databases: a statistical investigation, Jun. 19, 1972. 9pages.*
A Spatial Standards and Norms Proposal for FAO, FAO 2003, version 01, 59 pages.*

* cited by examiner

*Primary Examiner*—Jean M Corrielus
*Assistant Examiner*—Noosha Arjomandi
(74) *Attorney, Agent, or Firm*—Moser IP Law Group

(57) ABSTRACT

A method and apparatus for using a statistical process control to establish alarm criteria for backup processes in a storage management system. The method and apparatus accumulates sample parameters for a plurality of backup runs to build a statistical model of the backup process. The parameters collected from subsequent backup runs are compared to the norms within the model to determine whether the current backup fulfills those norms or is outside of those norms. If the current backup parameters are outside the norms, an alarm is triggered to indicate an abnormal situation.

15 Claims, 3 Drawing Sheets

METHOD AND APPARATUS FOR USING STATISTICAL PROCESS CONTROL WITHIN A STORAGE MANAGEMENT SYSTEM

BACKGROUND OF THE INVENTION

1. Field of the Invention

The present invention is generally related to storage management systems and, more particularly, to a method and apparatus for using statistical process control within a storage management system.

2. Description of the Related Art

To provide data redundancy and security within a computer network, information stored in a server connected to the network is backed up to a storage system on a periodic basis. Generally, a plurality of servers are connected to a backup server. The backup server serves as a primary component in a storage management system whereby timing and control of the backup processes are performed by the backup server. Periodically, information stored in the servers is copied to the backup server. The backup server generally stores the information within a mass storage system or device.

Each server within the network has specific backup needs that generally vary from server to server. To insure that backup processes are not incorrectly performed, the backup server utilizes a number of criteria to monitor server and backup performance. These criteria include no information available, oversized files, excessive backup time, and the like. When the backup process does not fulfill a specific criteria, the backup server will set an alarm to notify an operator of the backup failure. For expediency, the backup criteria are generally set the same for all servers within the network using a generic criteria that is designed to fit most situations. However, in practice, the alert criteria does not fit every situation. This results in the occurrence of both false positive and false negative alarms.

In other situations, no specific alarm criteria is used, rather a report is generated that contains all the backup parameters. An operator must review the reports to identify backup anomalies. Such review can be time consuming and lead to failure to identify backup problems when the volume of reported data is large.

Therefore there is a need in the art for an improved backup alarm generation system that is tailored to the requirements of each server.

SUMMARY OF THE INVENTION

The present invention is a storage management system that utilizes statistical process control to analyze backup process performance in a computer network. The invention is a method and apparatus that accumulates sample parameters for a plurality of backup runs to build a statistical model of the process samples. The norms of the model are used to create limits for subsequently collected parameters. For each backup that is completed after the statistical model is created, the parameters collected from these subsequent backups are compared to the norms within the model to determine whether the current backup fulfills those norms or is outside of those norms. If the current backup parameters are outside the norms for the specific backup being conducted for a specific server, then an alarm may be set to identify that an abnormal situation has occurred. In this manner, each server has a specific model that has specific norms that are used to analyze the performance of that particular server. Since each server has a set of norms that are established by the server itself, such modeling reduces the occurrence of false positives and false negatives for backup alarms.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
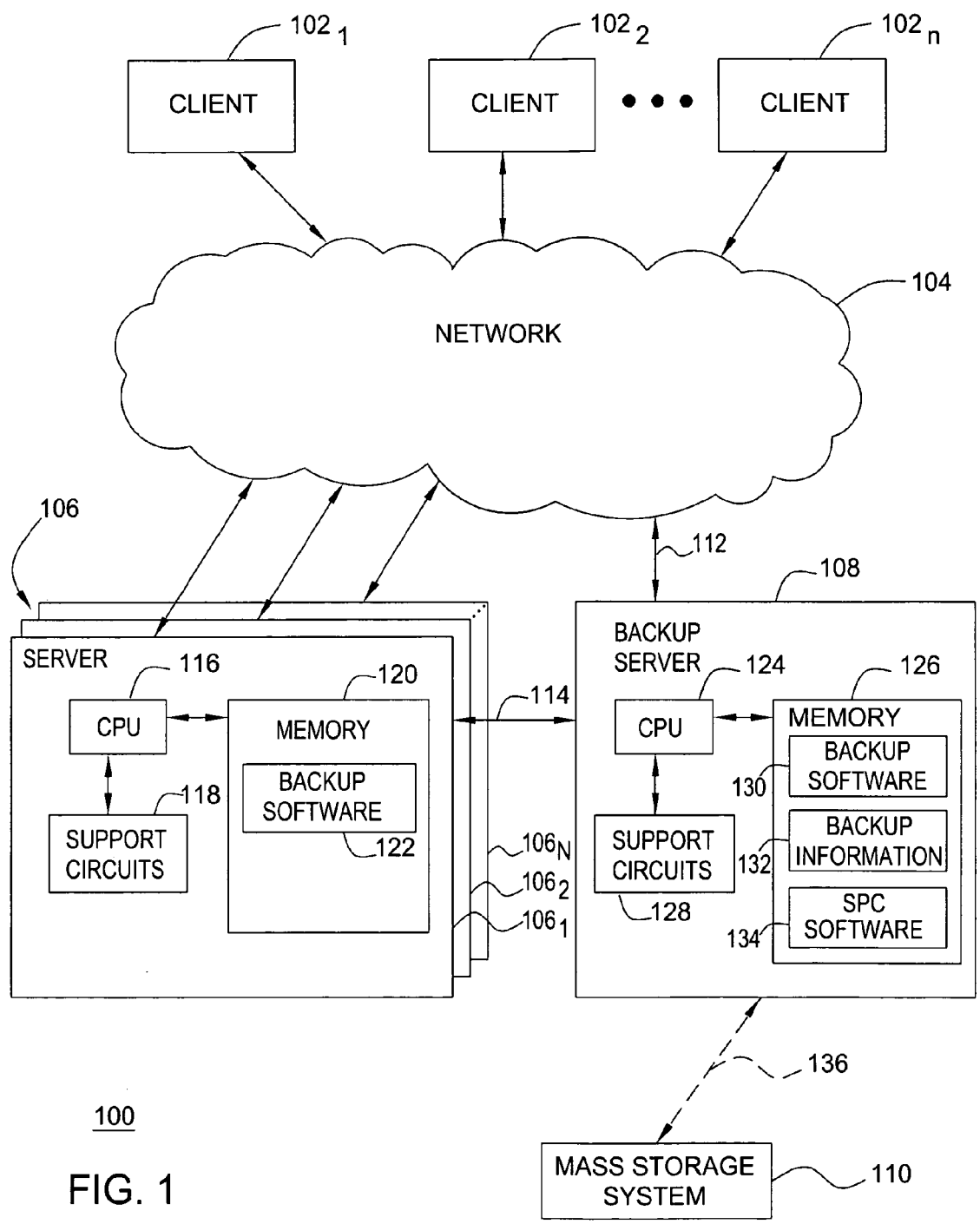
FIG. 1 depicts a block diagram of a computer network containing the present invention.

FIG. 1 is a block diagram of a computer network 100 in which one embodiment of the present invention may be utilized. The computer network comprises a plurality of client computers $102_1$, $102_2$ ... $102_n$ connected to a plurality of servers $106_1$, $106_2$ ... $106_n$ (collectively referred to as servers 106) via a network 104. The servers 106 are connected to at least one backup server 108. The connection to the backup server 108 may be through a private network 114 or connected through the public network 104 via connection 112. In some situations, both connections may be used.

In one embodiment of the invention, the backup server 108 is coupled to a mass storage system 110 via path 136. Although one backup server 108 and one mass storage system 110 is depicted, those skilled in the art will understand that there may be a plurality of either backup servers or mass storage systems to provide redundancy for the network. Also, the mass storage system 110 may be a part of the backup server, may be external to the backup server, may be remotely located from the backup server, or may be shared by multiple backup servers.

Each server 106 comprises a central processing unit (CPU) 116, support circuits 118 and memory 120. The CPU 116 may be one or more of any readily available microprocessors or microcontrollers. The support circuits 118 are well known support circuits that are used to facilitate operation of the CPU and comprise one or more circuits such as clock circuits, cache, power supplies, input/output circuits, and the like. The memory 120 may be any form of memory for storing software or digital information comprising one or more of random access memory, read only memory, disk drives, optical memory, flash memory, and the like. Specific to this invention, the server 106 stores in memory 120 backup software 122 that facilitates backup of information stored in the memory of at least one server 106 to the backup server 108.

The backup server 108 comprises a central processing unit (CPU) 124, support circuits 128 and memory 126. As with the servers 106, the CPU 124 may be one or more of any readily available microcontrollers or microprocessors. The support circuits 128 comprise well known circuits for support of the operation of the CPU 124. The circuits include one or more of clock circuits, cache, input/output circuits, power supplies and the like. The memory 126 may be any form of digital memory including one or more of random access memory, read only memory, disk drives, optical storage, removable storage, and the like. The backup server memory 126 generally stores a variety of software including backup software 130, the backup data 132 from at least one server 106, and the statistical process control software 134. The backup data 132 may be stored within the backup server either temporarily or more permanently depending upon the type of backup server involved, i.e., whether the backup server operates in write-through or write-back mode. The backup data 132 may be stored in mass storage system 110 for archival purposes. The mass storage system 110 may be any form of bulk storage including optical storage, tape drive storage, RAID storage, and the like.

In operation, server 106 will support the functionality of the client computers 102 to provide data and software for utilization by the client computers 102 through the network 104. Occasionally, the backup software 122 will be used to backup some or all of the data and other information within memory 120 of the server 106. The backup software 130 within backup server 108 periodically communicates with the backup software 122 within the various servers 106. The data and other information within memory 120 of the server 106 is moved to the memory 126 within the backup server 132. This backup information may be held temporarily in a cache before being moved to the mass storage system 110, or the backup information 132 may pass directly through the backup server to the mass storage system 110. These two processes are known as write-back and write-through respectively.

Figure 3:
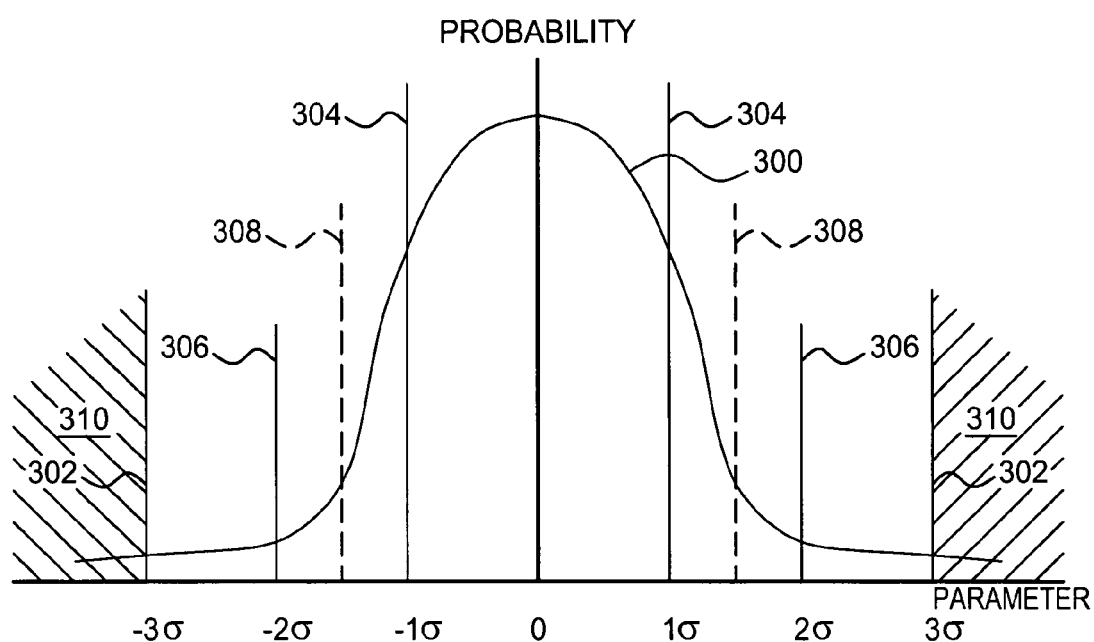
FIG. 3 depicts a distribution curve that is used by one embodiment of the invention.

The statistical process control software 134 monitors the backup parameters used during each backup process and establishes a statistical model for each server $106_1, 106_2 \ldots 106_n$. The model may also aggregate statistical information from multiple servers. Such parameters include, but are not limited to media errors and/or error rates, device errors and/or error rates, device backup rates and/or equipment capacities, total backup sizes and/or trends, capacity utilization, operation errors and/or error rates, and combinations thereof form the basis of the parameters that can be used to generate a statistical model. The model, in essence, is a probability distribution for the occurrence of the various parameters. These parameters generally form a normal distribution or bell curve 300 shown in FIG. 3. The "norm" of the bell curve is generally taken as the 3σ point 302 (i.e., 99.73% of the parameter samples fall within the 3 a point). In some situations, other norms may be used, e.g., 1σ point 304, 2σ point 306 or some arbitrary percentage 308. The "norm" is used as an alarm boundary for analyzing subsequently measured backup parameters. For any subsequent backup after the model is built, the parameter result that falls outside of the alarm boundary causes an alarm to be generated. In other words, if the 3σ point is used, an alarm is generated when a particular sample occurs that only has a 0.37% or less probability of occurring. For example, the occurrence of having seven samples in a row that are above or below the mean has a 1 in 128 chance of happening (i.e., 0.78%). If the boundary was set at 1%, an alarm would be generated when seven such samples occurred in a row. If the boundary were set at 3σ, an alarm would not be generated for the occurrence of seven such samples in a row.

Such an alarm does not indicate that a "fault" per se has occurred in the backup process. Generally, the alarm indicates that an abnormal situation has arisen that should be reviewed by an operator. As such, the statistical process control determines whether the process remains in control or when it begins to demonstrate instability and needs immediate attention. When an alert is necessary, in response to an alarm, an alert may be sounded, printed, displayed, e-mailed or otherwise communicated to a user or operator.

Figure 2:
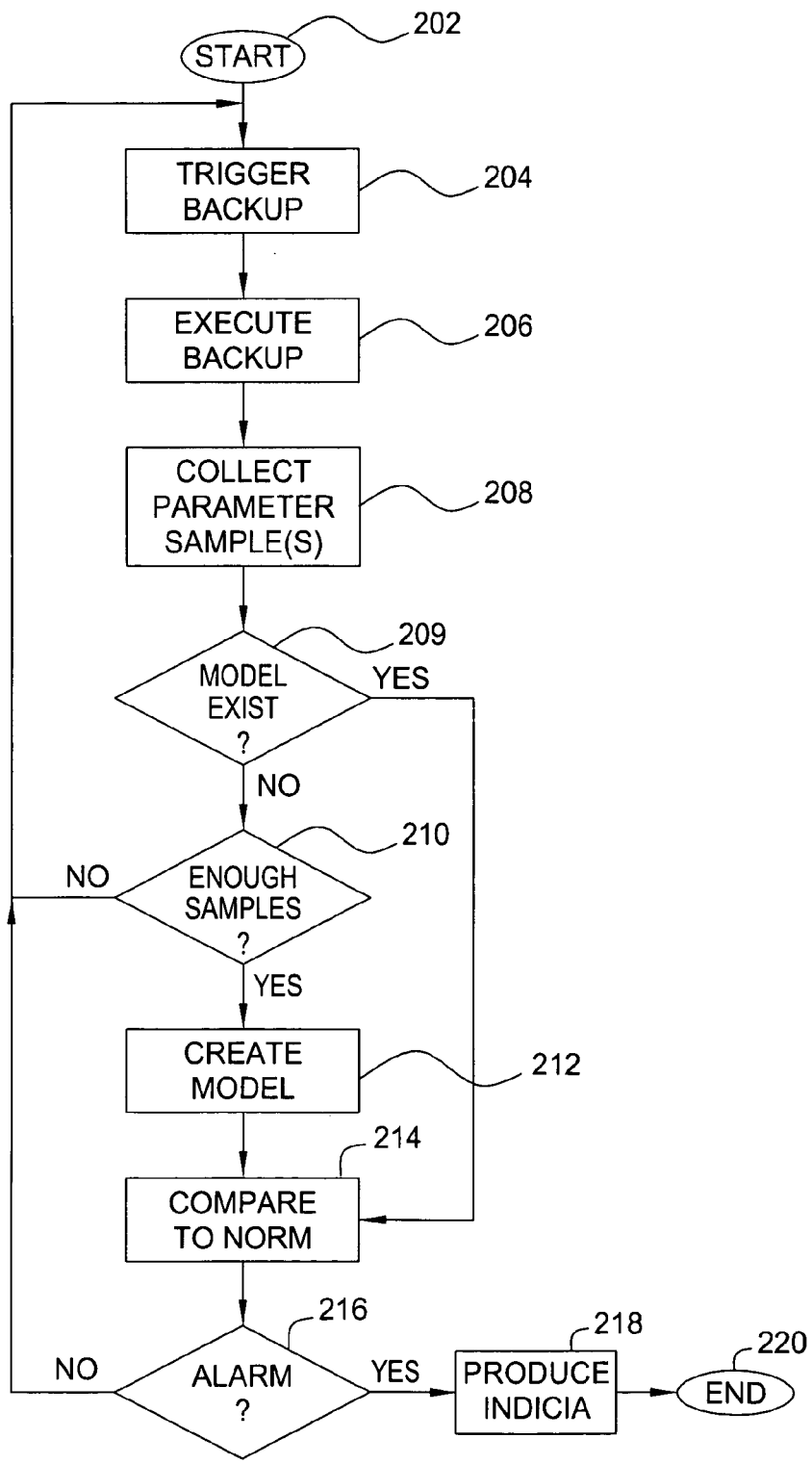
FIG. 2 depicts a flow diagram of a method of performing the process of the present invention.

FIG. 2 depicts a method 200 of operation of the statistical process control software 134. The method 200 begins at step 202 and proceeds to step 204 wherein a backup trigger is generated within the backup server 108 generally through a timer for a periodic backup. At step 206, a backup process is executed where the backup server 108 communicates with the server 106 to be backed up and initiate backup software on the server 106. The backup software 122 will couple data and other information to be backed up from the server 106 to the backup server 108 as described above. While the backup occurs, at step 208, certain backup parameters are sampled by the statistical process control software. A number of parameters may be monitored and sampled including, but not limited to, media errors and/or error rates, device errors and/or error rates, device backup rates and/or equipment capacities, total backup sizes and/or trends, capacity utilization, operation errors and/or error rates and combinations thereof.

At step 209, the method 200 queries whether a statistical model currently exists for the server being backed up. If the query is negatively answered, the method 200 proceeds to step 210. Otherwise, the method 200 proceeds to step 214.

At step 210, the method 200 determines whether or not enough backup runs have been triggered and parameters collected to create a statistical model. Generally 25-30 runs are necessary to have a statistically significant sample set to create a statistical model. If not enough samples have been collected, the method 200 returns to step 204 to await the next backup trigger. Steps 204, 206, 208 and 210 will be repeated until a statistically significant set of runs have been completed. Upon the statistically significant set of runs being completed, the query at step 210 will be answered affirmatively and the method 200 proceeds to step 212.

At step 212, the method 200 processes the samples to create a statistical model. Typically, the model forms a distribution curve (300 in FIG. 3) for the samples that have been collected. The norm of the distribution, typically at the 3σ point 302, is then computed and used as a parameter threshold for subsequent backup runs. Of course, other norms or combinations of norms could be used. Once the model exists, the method 200 proceeds from step 209 to step 214 for each subsequent backup run. At step 214, the parameters from these subsequent backup runs are compared to the norm. At step 216, if the new sample is outside of the norm (area 310 of FIG. 3), an alarm is generated and, at step 218, the method 200 produces an alarm (e.g., a fault) indicia. The method 200 ends at step 220 after the alarm has been indicated. If, at step 216, an alarm is not found and the latest sample of the parameters is within the norm the method proceeds to step 204 and awaits the next backup trigger. The comparison to the norm for alarm generation is one form of backup performance analysis. The comparison values may also be used to optimize backup performance, determine performance trends, and the like.

One example of use of the invention involves using the backup file size as the parameter to be monitored. After a number of backup runs, the file size from a particular server may average, for example, 4 Mbytes with a 3σ boundary at ±200 k bytes. Thus, all backup runs with a backup file between 3.8 and 4.2 Mbytes would be considered normal.

99.73% of the backup runs are expected to produce a backup file in this range. If a file was produced that was abnormally large (e.g., greater than 4.2 Mbytes) or abnormally small (e.g., smaller than 3.8 Mbytes), a fault alarm would be created. An operator could then look into the reasons for the fault. Each server would automatically establish its own level of normalcy based on its historical backup performance. As such, the fault errors that occur when using a "one size fits all" parameter threshold would be avoided. Additionally, the model and norms are automatically generated without operator intervention.

An operator could establish other statistically significant criteria for setting an alarm. For example, after establishing a norm as above, an alarm may be created when there were an unexpected number of comparison values in succession that formed a statistically unlikely situation, such as seven or more values in a row that were all below the statistical mean, or more than one value in succession that was in the same $2\sigma$ to $3\sigma$ range. Additionally, alarms can be generated in varying degrees depending on the extent of the abnormality, i.e., the magnitude of the comparison value. For example, an abnormal result or results occurring a substantial distance from the boundary may result in a more urgent alarm than results that are near the boundary.

Once a model is created, additional samples may or may not be added to the model. The operator can thus choose whether the model will adapt to operational changes of backup process or remain static.

By using statistic process control, where each server establishes its own fault boundaries based on its "normal" backup performance, the backup process is less likely to have false negative and/or false positive fault indications generated during a backup process. The parameters used in creating the model can be tailored to a customer's specific situation as to what is important to their statistical processing and backup requirements.

While the foregoing is directed to embodiments of the present invention, other and further embodiments of the invention may be devised without departing from the basic scope thereof, and the scope thereof is determined by the claims that follow.

The invention claimed is:

1. A computer-implemented method of analyzing backup performance comprising: creating, using a computer, a statistical model for a plurality of samples of at least one backup parameter obtained from information backed up from at least one server to the computer;
   determining a norm of said statistical model;
   wherein the norm defines statistical distribution probability for at least one of a 1a, 2a or 3a points;
   comparing a subsequently measured sample of said at least one backup parameter to the norm to produce a comparison value; and
   using the comparison value as an indicia of backup performance for backups from the at least one sever to the computer.

2. The method of claim 1 wherein said statistical model forms a normal distribution.

3. The method of claim 1 wherein said creating step further comprises collecting a statistically significant number of samples.

4. The method of claim 1 wherein the indicia of backup performance indicates when a fault has occurred in a backup process.

5. The method of claim 1 wherein the parameters comprise at least one of media errors, media error rates, device errors, device error rates, device backup rates, equipment capacities, total backup sizes, backup size trends, capacity utilization, operation errors, and operation error rates.

6. The method of claim 1 further comprising analyzing a plurality of comparison values before producing an indicia of backup performance.

7. A computer-implemented method of determining fault occurrence in a backup process comprising:
   creating, using a computer, a normal distribution for a plurality of samples of a backup parameter obtained from information backed up from at least one server to the computer;
   determining a norm of said normal distribution;
   wherein the norm defines statistical distribution probability for at least one of a 1a, 2a or 3a points;
   comparing a subsequently measured sample of said backup parameter to the norm to produce a comparison value; and
   if the comparison value indicates that the subsequently measured sample exceeds the norm, indicating that a fault has occurred in the backup process, if not, the sample parameter is within the norms.

8. The method of claim 7 wherein said creating step further comprises collecting a statistically significant number of samples.

9. The method of claim 7 further comprising analyzing a plurality of comparison values before producing an indicia of backup performance.

10. Apparatus for analyzing backup performance comprising:
    means for creating, using a computer, a statistical model for a plurality of samples of at least one backup parameter;
    means for determining a norm of said statistical model;
    wherein the norm defines statistical distribution probability for at least one of a 1a, 2a or 3a points;
    means for comparing a subsequently measured sample of said at least one backup parameter to the norm to produce a comparison value; and
    means for using the comparison value as an indicia of backup performance.

11. The apparatus of claim 10 wherein said statistical model forms a normal distribution.

12. The apparatus of claim 10 wherein said means for creating further comprises means for collecting a statistically significant number of samples.

13. The apparatus of claim 10 wherein the indicia of backup performance indicates when a fault has occurred in a backup process.

14. The apparatus of claim 10 wherein the parameters comprise at least one of media errors, media error rates, device errors, device error rates, device backup rates, equipment capacities, total backup sizes, backup size trends, capacity utilization, operation errors, and operation error rates.

15. The apparatus of claim 10 further comprising means for analyzing a plurality of comparison values before producing an indicia of backup performance.

* * * * *

UNITED STATES PATENT AND TRADEMARK OFFICE
CERTIFICATE OF CORRECTION

| | | |
|---|---|---|
| PATENT NO. | : 7,664,797 B1 | Page 1 of 1 |
| APPLICATION NO. | : 11/045610 | |
| DATED | : February 16, 2010 | |
| INVENTOR(S) | : William R. Weisgerber | |

It is certified that error appears in the above-identified patent and that said Letters Patent is hereby corrected as shown below:

In Column 5, line 48, change "one of a 1a, 2a & 3a" to -- one of a $1\sigma$, $2\sigma$ & $3\sigma$ --

In Column 6, line 17, change "one of a 1a, 2a & 3a" to -- one of a $1\sigma$, $2\sigma$ & $3\sigma$ --

In Column 6, line 38, change "one of a 1a, 2a & 3a" to -- one of a $1\sigma$, $2\sigma$ & $3\sigma$ --

Signed and Sealed this
Eighteenth Day of January, 2011

David J. Kappos
*Director of the United States Patent and Trademark Office*